No. 704,602. Patented July 15, 1902.
R. T. VAN VALKENBURG.
GATE.
(Application filed Sept. 20, 1901.)
(No Model.)
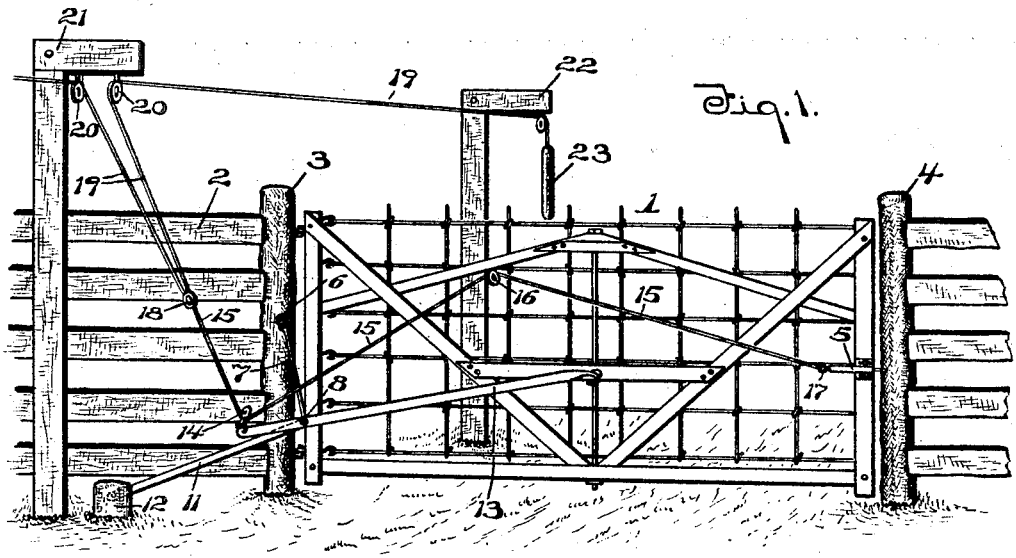
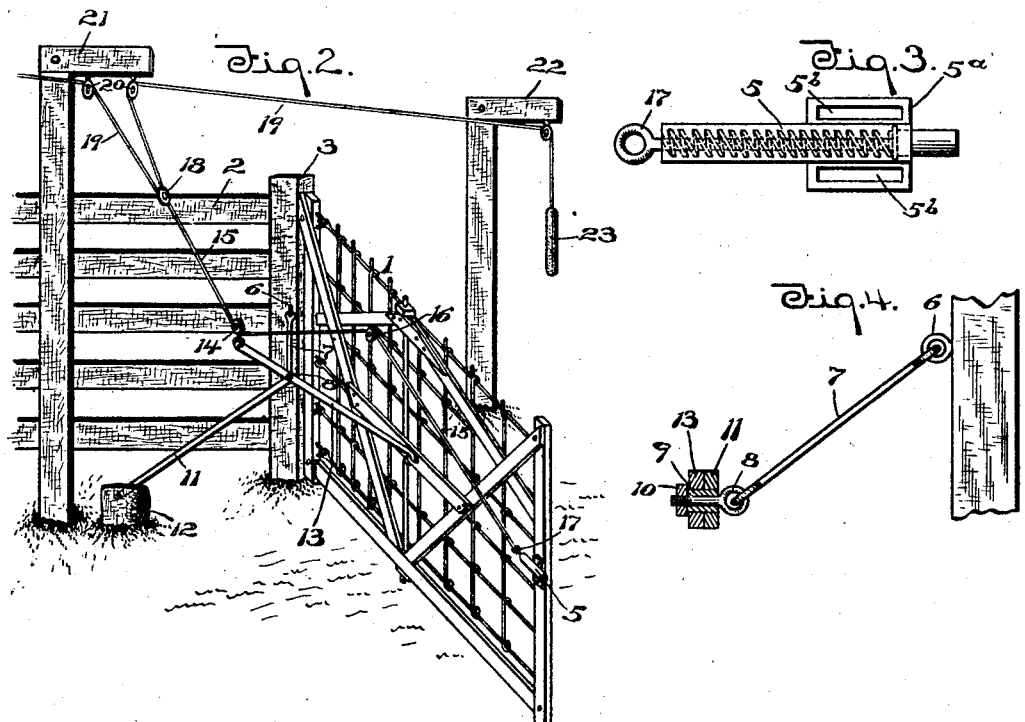

United States Patent Office.

RANDALL T. VAN VALKENBURG, OF LAPORTE, INDIANA, ASSIGNOR OF ONE-HALF TO WILLIAM E. CRICHTON, OF LAPORTE, INDIANA.

GATE.

SPECIFICATION forming part of Letters Patent No. 704,602, dated July 15, 1902.

Application filed September 20, 1901. Serial No. 75,828. (No model.)

*To all whom it may concern:*

Be it known that I, RANDALL T. VAN VALKENBURG, a citizen of the United States, residing at Laporte, in the county of Laporte and State of Indiana, have invented certain new and useful Improvements in Gates; and I do hereby declare the following to be a full, clear, and exact description of the invention, such as will enable others skilled in the art to which it appertains to make and use the same.

My invention relates to an improvement in farm-gates; and its object is to provide a simple, economical, and efficiently-operated gate which can be opened or closed either adjacent thereto or at a distance therefrom and without dismounting from a vehicle.

My invention consists in the construction, combination, and arrangement of parts, which will be more fully described hereinafter, illustrated in the accompanying drawings, and finally pointed out in the appended claims.

Referring to the drawings, Figure 1 is a perspective view of my improved gate and its operating mechanism when the gate is closed. Fig. 2 is a perspective view of the gate, showing the position of the operating parts when the gate is open. Fig. 3 is an elevation of the gate-latch, and Fig. 4 is a detail view showing the connection of the toggle-joint with the gate-operating lever.

Like numerals of reference designate corresponding parts in the several figures of the drawings.

In carrying out the invention the essential parts of the mechanism adapting the gate to be opened and closed are so constructed and related to each other that they may be applied to a gate of any form. However, the preferred embodiment of the gate 1 is shown in the drawings, in which the operating mechanism is applied to a gate made from a metal frame filled up by wire-netting and braced by diagonal rods to add strength and rigidity thereto; but the invention is applicable to a gate constructed from wooden panels or pickets.

2 designates the end of a fence having the usual post 3, to which the gate is hinged in the usual manner, and 4 represents another post of the other end of the fence, which contains a keeper for the spring-latch 5. Pivoted to the eye 6, secured in the corner-post 3, is a rod 7, engaged by and pivotally connected at its other end to the eye of a bolt 8. This bolt is provided with a sleeve 9 and a nut 10. A second rod 11 is connected to a post 12 or other suitable anchorage, and its other end is journaled upon the sleeve 9 and is thus supported by the bar 7 and forms a toggle connection therewith.

13 designates a lever pivotally secured at one end to the gate and journaled on the sleeve 9 and extending beyond the toggle connection of the rods 7 and 11. The extended or free end of the lever carries a pulley 14, through which the rope 15 passes to a pulley 16, supported on the gate, and the end of the rope is connected with the spring-operated rod 17 of the latch 5, while its other end is connected to a sheave-block 18. Through this sheave-block 18 passes a rope 19, which extends in opposite directions around the pulleys 20, supported on the bracket-post 21, to the pulleys on the bracket-posts 22. The bracket-posts 22 are set in line with the post 3 at some distance in the road on each side of the gate, so that the weighted handles 23 may be grasped before the gate is reached. The casing of the spring-latch 5 has the flat ears $5^a$, provided with the longitudinal slots $5^b$, through which the tightening-bolts pass to secure the latch upon the gate. By unfastening the tightening-bolts in the slots $5^b$ the latch may be adjusted longitudinally upon the gate to adapt it to readily engage the keeper in the post 4 when the gate has become deranged by reason of sagging or shrinkage. Within the tubular casing of the latch is mounted a spring which serves to hold the latch-rod 17 in engagement with the keeper, but which is compressed when the rod is pulled rearwardly by the rope 15.

From the foregoing it will be seen that a pull upon the weighted handle 23 will likewise pull the rope 15 and draw the free end of the lever 13 upwardly and rearwardly, and the rods 7 and 11 will likewise be thrown up and around the rear of the posts 3 by reason of their toggle connection. This will of course draw on the lever 13 sufficiently to open the gate as the rope 15 at the same time withdraws the latch-rod 17 against the tension of its spring in the casing and releases it from the keeper in the post 4. When the gage is operated, the rope 19 is prevented from slipping around pulley 18 by the handle 23, which comes in contact with the pulley on the opposite post 22.

Having thus described my invention, what I claim, and desire to secure by Letters Patent, is—

1. An operating mechanism for gates comprising a lever pivotally secured at one end to the gate and having an extended free end for connection with an operating-rope, rods connected with the lever between its ends to form a toggle-joint connection to control the movements of said lever and gate, an adjustable latch on the gate and a rope connected to the free end of the lever and to the latch to operate both latch and lever simultaneously when the rope is pulled.

2. An operating mechanism for farm-gates comprising a lever pivotally secured at one end to the gate, a rod pivotally hung upon a post and carrying at its other end a bolt, a rod secured at one end to an anchor-post and its other end journaled to the bolt to form a toggle connection, said lever also journaled on the bolt, an adjustable spring-latch on the gate, a rope connected to the spring-latch and to the free end of the lever, bracket-posts positioned on each side of the gate opposite its hinges, a connection supported by the bracket-posts and secured to the rope for operating the latch, the lever, and the toggle connection simultaneously, and thereby open the gate, substantially as specified.

In testimony whereof I affix my signature in presence of two witnesses.

RANDALL T. VAN VALKENBURG.

Witnesses:
HUGO OLTSCH,
MAGGIE OLTSCH.